(12) United States Patent
Ghaly et al.

(10) Patent No.: US 12,265,726 B2
(45) Date of Patent: Apr. 1, 2025

(54) USER SELECTABLE TRANSITIONAL STORAGE PARTITION

(71) Applicant: Microsoft Technology Licensing, LLC, Redmond, WA (US)

(72) Inventors: Mai Ghaly, San Jose, CA (US); Thomas Fahrig, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 74 days.

(21) Appl. No.: 17/987,509

(22) Filed: Nov. 15, 2022

(65) Prior Publication Data

US 2024/0160376 A1    May 16, 2024

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0604; G06F 3/0605; G06F 3/0608; G06F 3/0644; G06F 3/0655; G06F 3/0679

See application file for complete search history.

(56) References Cited

U.S. PATENT DOCUMENTS

2016/0283503 A1*  9/2016  Parikh .............. G06F 16/2282
2019/0332298 A1  10/2019  Madabhushi
2019/0377508 A1  12/2019  Bahar
2021/0191853 A1*  6/2021  Xu .................. G11C 11/4085
2021/0232313 A1  7/2021  Clark
2022/0326877 A1  10/2022  Byom

FOREIGN PATENT DOCUMENTS

CN    107506137 A    12/2017
WO    2022011683 A1    1/2022

OTHER PUBLICATIONS

International Search Report and Written Opinion received for PCT Application No. PCT/US23/035363, Jan. 22, 2024, 17 pages.

* cited by examiner

*Primary Examiner* — Yong J Choe
(74) *Attorney, Agent, or Firm* — Rainier Patents, P.S.

(57) ABSTRACT

A user can select a capacity setting for a transitional partition that determines the allocation between a low-density partition and a high-density partition in the transitional partition. The transitional partition can dynamically change among multiple settings having different capacities for the low-density partition. If the current setting of the transitional partition does not efficiently utilize the available storage space based on the user's preferences for storing different types of data in the low-density partition and the high-density partition, then the user can choose to change the transitional partition to a different setting that better suits the individual user's storage allocation preferences. Therefore, valuable storage space will not be under-utilized but instead will be repurposed for more efficient use by converting a low-density partition to a high-density partition, and vice versa.

20 Claims, 5 Drawing Sheets

USER SELECTABLE TRANSITIONAL STORAGE PARTITION

BACKGROUND

The size of data is growing in many technological industries. For example, higher resolution photos and videos, more feature-packed video games, higher quality audio, increasing use of cloud computing and cloud storage, increasing number of social media posts, and continuing digitization of information have all increased the amount of data. This trend of increasing data size demands larger storage capacities. However, storage is limited and costly resource.

SUMMARY

Not all types of storage are the same. Some types of storage are more efficient and cost-effective for frequent access operations (i.e., reads and/or writes), while other types of storage are more efficient and cost-effective for seldom access operations. Similarly, not all types of data are the same. Some types of data demand frequent access, whereas other types of data are accessed seldomly. Accordingly, it is sensible to store high-access data in high-access storage and store low-access data in low-access storage. Unfortunately, data size and data usage are rarely so fixed. Data size requirements and data access demands can vary over time, vary among users, and vary for different applications.

The concepts described herein relate to a transitional storage partition that enables the user to dynamically change the size of a high-access storage partition and the size of a low-access storage partition within the transitional partition. The user can change the sizes of the partitions as her preferences for storage capacity and data access frequency change. Contrary to having fixed-sized storage partitions, variable-sized storage partitions that can dynamically reallocate the limited storage space between the high-access storage partition and the low-access storage partition to enable more efficient use of storage space and improve data access performance. These benefits enhance system responsiveness and improve the user experience.

BRIEF DESCRIPTION OF THE DRAWINGS

The detailed description below references accompanying figures. The use of similar reference numbers in different instances in the description and the figures may indicate similar or identical items. The example figures are not necessarily to scale.

DETAILED DESCRIPTION

Figure 1:
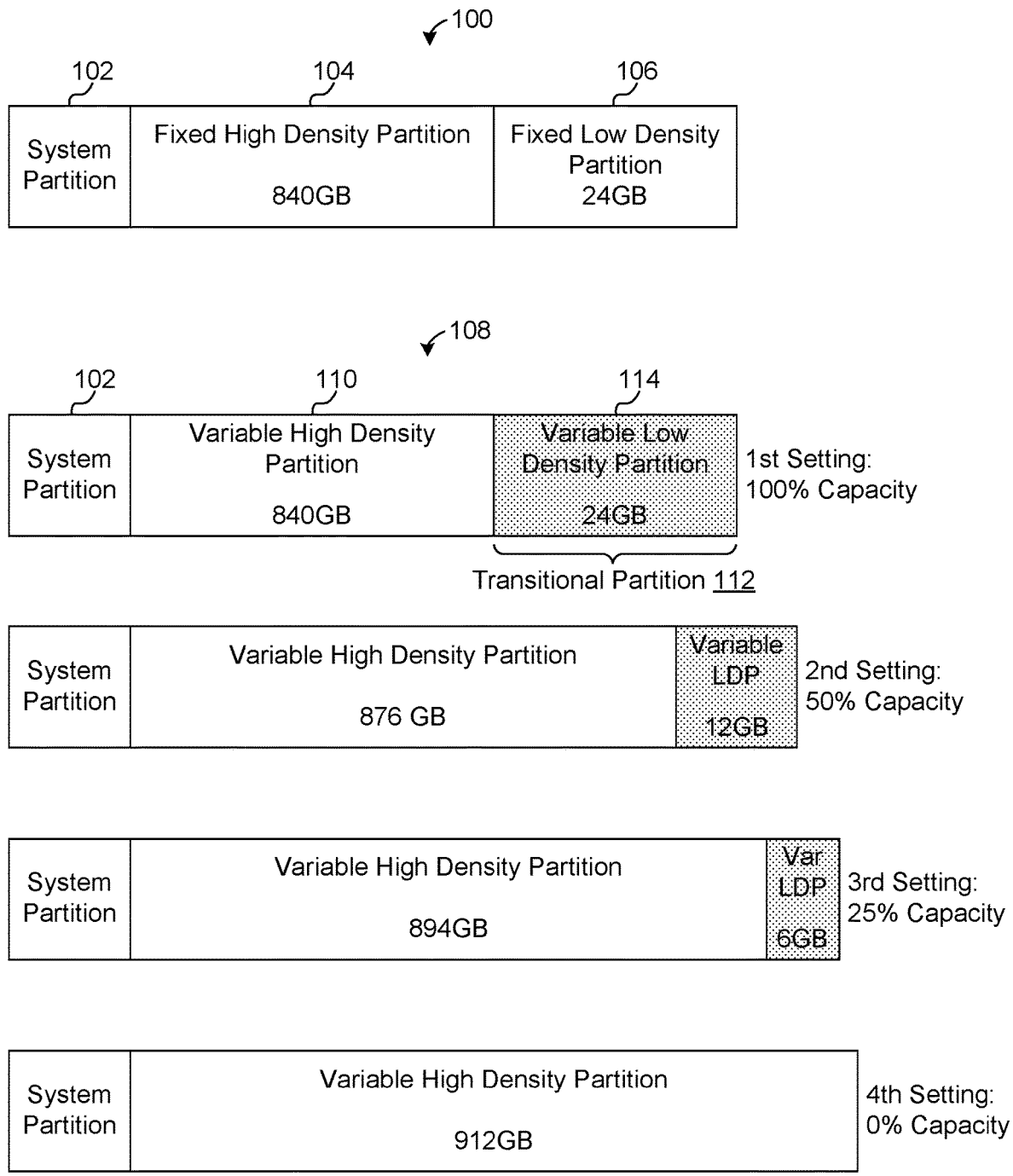
FIG. 1 illustrates example conventional fixed storage partitions and example variable storage partitions, consistent with some implementations of the present concepts.

The present concepts will be described below in the context of storing video game data, including quick-resume data, in solid state drives (SSDs) for the purpose of illustrating an example application of the present concepts. However, these concepts can be applied to other types of data and other types of storage.

Technological Background

Storage media can include multiple memory cells (e.g., NAND transistors) for storing bits of data. A single-level cell (SLC) stores only one bit of data. For example, the amount of charge stored in the transistor is determined to represent 0 or 1 based on whether the charge value is above or below a single threshold. As such, an SSD module with a billion transistors that are configured to operate as SLCs can store up to a billion bits of data. A multi-level cell (MLC) is capable of storing more than one bit of data. For example, a double-level cell (DLC) stores two bits of data. The amount of charge stored in the transistor is determined to represent 00, 01, 10, or 11 depending on how the charge value compares to three thresholds. Accordingly, an SSD module with a billion transistors that are configured to operate as DLCs can store up to two billion bits of data, which is twice as much information as an SSD module operating in an SLC mode. Furthermore, a triple-level cell (TLC) is capable of storing three bits of data, a quad-level cell (QLC) is capable of storing four bits of data, a penta-level cell (PLC) is capable of storing five bits of data, and so on. Although the term "multi-level cell" can be used to specifically refer to a double-level cell, the term "multi-level cell" will be used herein to generally refer to a memory cell that stores more than one bit (e.g., DLC, TLC, QLC, PLC, etc.).

Higher level cells and lower level cells have their pros and cons. SLCs are the costliest to manufacture per a given storage capacity, because SLCs offer the lowest-density memory, whereas MLCs (progressively from DLC to PLC) are more cost-effective for a given storage capacity because they offer higher-density memory. However, SLCs offer enhanced performance (e.g., faster read and write speeds), compared to MLCs. Moreover, MLCs are less reliable (i.e., are more prone to errors) due to the smaller margins between the multiple thresholds, whereas SLCs are more reliable. Additionally, SLCs have higher endurance (i.e., a higher maximum number of reliable write cycles allowed during the lifetime of the cell and therefore longer lifespan) relative to MLCs.

Accordingly, there is a tradeoff between the advantages and the disadvantages of using a low-density storage (e.g., SLCs) versus a high-density storage (e.g., MLCs). For this reason, system designers weigh the various factors (including storage capacity, size of the data anticipated to be stored, read/write speed demands, endurance, cost, anticipated access frequency, etc.) when choosing whether to use SLCs or MLCs (or when choosing among the various levels of MLCs). For example, a system designer can choose SLCs for storing a relatively small amount of data that requires frequent write operations (i.e., the data changes often) versus MLCs for storing a large amount of data that remains relatively static (i.e., the data rarely changes).

A video game console can include an internal SSD. A user can download video games from online sources and persistently store game data in the SSD. Typically, launching a game to play can take a long time (e.g., one or more minutes). Furthermore, the user may close the game (e.g., to switch to playing another game) or turn off the video game console entirely. Then, the next time the user wants to play the game again, the user would have to launch the game again, which would take a long time. Moreover, the user would have to start over from the beginning of the game. That is, the state of the game and the user's progress (either all or a part of the progress) in the game are lost when the game was closed.

To address the above problems, some game consoles and/or some video games implement and offer a quick-resume feature. When the user closes the game (either to switch to playing another game or to stop playing altogether), the quick-resume feature will place the game in a suspended state and save the state of the game exactly at the point where the user left it. For example, a game console saves quick-resume data, which can include a memory dump of the game state as well as additional metadata. The next time the user launches the game, the game console reloads the quick-resume data, restores the suspended state, and resumes the game from where the user left off rather than launching from the start of the game. The load time for restoring the quick-resume state is much faster (e.g., five seconds) than launching the game from the beginning. Additionally, the quick-resume feature brings the user back to the point in the game when the game was last closed rather than forcing the user to start over from the beginning.

Although game data and quick-resume data could be stored in the same partition, such an implementation would result in inefficient use of storage space. Game data typically does not change. For example, a user finds a game online that she wants to play, downloads the game data, and stores the game data in the SSD of the video game console. When the user plays the game, the game data is read from the SSD but the game data is not changed. Even if the user plays the game many times for several years, the game data could remain unchanged unless the game is updated or deleted. Quick-resume data, on the other hand, changes frequently. Each time the user plays the game and decides to save the current state of the game to resume playing at a later time, new quick-resume data is generated and written to the SSD. If the user resumes the game using the quick-resume data and then decides again to save a new state of the game to resume playing at a later time, then new quick-resume data is generated and written to the SSD, which may overwrite the previous quick-resume data. Therefore, if the user pauses playing the game multiple times throughout the day, saving the current state each time using the quick-resume feature, then the quick-resume data could be modified many times.

Storing relatively static data (e.g., the game data) and relatively dynamic data (e.g., the quick-resume data) together in a high-density storage (e.g., TLC) is inefficient because the high-density storage suffers from slow access speeds and low endurance. Thus, the quick-resume feature would not function very quickly (i.e., reloading the saved game state would take a long time). Furthermore, the high-density storage would not last very long, because the lifespan of the high-density storage would be cut short by repeated writes operations for the quick-resume data.

Storing relatively static data (e.g., the game data) and relatively dynamic data (e.g., the quick-resume data) together in a low-density storage (e.g., SLC) is also inefficient because the low-density storage suffers from low storage capacity and high costs. Video game console market is competitive. Consumers desire a lot of features and a lot of storage capacity for the lowest price. The low-density storage would be expensive but not be able to store many games for the user to play. Also, the high access speeds of the low-density storage would be wasted on the game data, which is relatively static.

To address the above problems, the SSD in the video game console can include two different partitions for storing the game data and the quick-resume data. That is, the SSD can include a high-density partition (e.g., operating in a TLC mode) for storing the game data and also include a low-density partition (e.g., operating in an SLC mode) for storing the quick-resume data. Accordingly, a game console designer can ask an SSD storage manufacturer to allocate a certain amount of SSD storage space to a TLC partition for storing game data and allocate another amount of SSD storage space to an SLC partition for storing quick-resume data. For example, the game console designer can review gamer consumer data and decide that a typical gamer wants the ability to store quick-resume data for 3 or 4 games and the ability to store game data for about 10 to 20 games. Therefore, the game console designer decides to allocate a portion of the limited storage space to be a high-density partition for storing static game data and the other portion of the limited storage space to be a low-density partition for storing dynamic quick-resume data.

Technological Problems

The allocation between a high-density partition and a low-density partition is set and fixed by the SSD storage provider at the time of manufacturing. That is, the size of the high-density partition (e.g., TLC) and the size of the low-density partition (e.g., SLC) cannot be modified by a gamer after purchasing the game console.

However, not all gamers are the same. Some gamers prefer playing role-playing games and adventure games that require saving the gamer's progress, whereas other gamers prefer playing multiplayer online battle games that do not benefit as much from saving the current state. Some gamers have a lot of free time to play games from start to finish, and therefore rarely need to use the quick-resume feature. Other gamers, on the other hand, have limited time to play games and often need to save the current state of the game using the quick-resume feature to resume playing at a later time. Some gamers get bored easily playing the same game for a long time and instead prefer playing a variety of games, switching often from one game to the next using the quick-resume feature. Whereas, other gamers prefer playing one or a few of their favorite games for a long time and thus would not use the quick-resume feature as much. Some gamers share the game console with other users (siblings, friends, etc.) and often need to pause and save the game state using the quick-resume feature to let other users have their turn playing games. Other gamers monopolize their game consoles and therefore have less demand for the quick-resume feature. Accordingly, different gamers have different preferences for how much storage space they want to have for storing game data and how much storage space they want to have for storing quick-resume data.

Because the preference for allocating storage space between the game data partition and the quick-resume data partition varies among gamers, fixing the sizes of the two partitions at the time of manufacture cannot satisfy the unique preferences of all individual gamers. That is, some gamers will want to save more quick-resume states than the quick-resume data partition capacity will allow while a substantial portion of the game data partition remains unused. For such gamers, the unused game data partition space could be better utilized as quick-resume data partition space. On the other hand, some gamers will want to store more games than the game data partition capacity will allow while a substantial portion of the quick-resume data partition remains unused. For these gamers, the unused quick-resume data partition space can be better utilized as game data partition space.

The unused storage space represents an inefficiency problem that cannot be rectified because the allocation between the game data partition and the quick-resume data partition is fixed. This problem has been worsening over time and will continue to worsen as game data size and quick-resume data size continue to grow as games become more sophisticated, more complex, higher quality, more detailed, more feature packed, etc. One game today can take up well over 100 gigabytes (GB) and games are continuing to grow in size. With larger games, the limited storage space is filling up faster with only a few games.

This problem is further worsening as storage technology advances and is able to manufacture even higher density storage. The tradeoff between the game data storage space and the quick-resume data storage space is not a one-to-one (1:1) ratio. To illustrate, if the quick-resume data is stored in an SLC partition and the game data is stored in an DLC partition, then each gigabyte of storage space that is allocated to the quick-resume data partition sacrifices two gigabytes of storage space in the game data partition (i.e., a 2:1 ratio). If the quick-resume data is stored in an SLC partition and the game data is stored in a TLC partition, then each gigabyte of storage space that is allocated to the quick-resume data partition sacrifices three gigabytes of storage space in the game data partition (i.e., a 3:1 ratio). The ratio for a QLC partition would be 4:1, for a PLC partition would be 5:1, and the ratio would be even higher for higher density partitions. As such, any unused space in the quick-resume data partition represents an even larger sacrifice of storage space in the game data partition as the density of the game data partition increases with advancing technology.

Gamers, whose game data partition is full but has unused storage space in the quick-resume data partition, are unable to download new games. These gamers are forced to delete their existing games to make space in the game data partition to download new games. Alternatively, these gamers would have to buy an external storage drive in order to download the new games without deleting the existing games in the internal storage space. As such, these gamers would be dissatisfied with the fixed allocation of partitions that does not match their usage and preferences. And these gamers are incapable of correcting the inefficient allocation of storage space by reallocating the unused storage space in the quick-resume partition to add more storage space to the game data partition. The inflexible hardline between the game data partition and the quick-resume partition can frustrate these gamers.

Technological Solutions

The present concepts address the technological problems discussed above with technological solutions that enable the allocations between a high-density partition and a low-density partition to be flexibly adjusted by a user. That is, the user can choose to dynamically change the sizes of the partitions to meet her individualized preferences, which may be different from the preferences of other users and which can change over time.

In the gaming context, a gamer can choose to trade off some or all of the quick-resume data storage space for the game data storage space. For example, if the quick-resume partition is 50 GB in total, the gamer can choose to reduce the size of the quick-resume partition to only 15 GB, because such an allocation is enough to meet this particular gamer's preference. The remaining 35 GB (50 GB minus 15 GB) of storage space can be repurposed for the game data storage. Moreover, because the quick-resume data partition is of lower density memory than the game data partition, multiples of the 35 GB space (e.g., 70 GB, 105 GB, 140 GB, 175 GB, etc., depending on whether the conversion ratio is 2:1, 3:1, 4:1, 5:1, etc.) can be added to the game data partition.

Accordingly, if a gamer no longer has enough free space in the game data partition to download a new game but has free space available in the quick-resume data partition, then the gamer can convert the free space in the quick-resume partition into additional free space in the game data partition in order to download the new game. Conversely, if a gamer no longer has enough free space in the quick-resume data partition to save the quick-resume state of a new game but has free space available in the game data partition, then the gamer can convert the free space in the game data partition into additional free space in the quick-resume partition in order to save the quick-resume state of the new game. Therefore, the present concepts allow flexible storage allocations that can satisfy multiple users who have different storage use preferences as well as satisfy a single user whose storage use preferences change from time to time.

In one implementation, a storage module can include a user partition of high-density memory (e.g., TLC) and a transitional partition that can change between high-density memory and low-density memory (e.g., SLC) to accommodate individual user preferences. A portion or the entirety of the transitional partition that is converted from low-density memory to high-density memory is added (i.e., appended or merged) to the user partition. The transitional partition can be logically situated at the tail end of the user partition so that there is no impact on the logical locations (e.g., the logical block addresses (LBAs)) of the existing data stored in the user partition. This implementation can minimize the overhead processing cost associated with converting the transitional partition. In one implementation, the user partition and the transitional partition are logically contiguous regardless of how much of the transitional partition is low-density memory (i.e., for all capacity settings of the transitional partition).

In one implementation, the storage module includes a storage controller that can be commanded to change the allocation of high-density memory and low-density memory in the transitional partition. For example, the storage controller can implement a Non-Volatile Memory Express (NVMe) set feature command that can modify what portion of the transitional partition is set to SLC versus TLC.

The flexibility to dynamically change the distribution of storage space between the high-density partition and the low-density partition has several technical advantages. Underutilized storage space that can be better utilized for other purposes can be reallocated to increase storage space utilization. Giving the end users the control to allocate the storage space for various purposes to meet their individual needs increases user satisfaction. Furthermore, the storage allocation can be changed to match the user's evolving preferences for storage usage over time.

Transitional Partitions

FIG. 1 illustrates example conventional storage partitions and example dynamic storage partitions, consistent with some implementations of the present concepts. A conventional storage module 100 includes a system partition 102, a fixed high-density partition 104, and a fixed low-density partition 106. The system partition 102 stores system data, such as a boot loader, an operating system, firmware, applications, etc. The fixed high-density partition 104 is configured as a TLC memory and its size is fixed at 840 GB. The fixed low-density partition 106 is configured as an SLC memory and its size is fixed at 24 GB. In an example gaming context, the conventional storage module 100 is an SSD module inside a game console. The fixed high-density partition 104 is a user partition for storing games downloaded and saved in the game console. The fixed low-density partition 106 is a quick-resume partition for storing quick-resume data. As discussed above, the size of the fixed high-density partition 104 and the size of the fixed low-density partition 106 cannot be modified by the user. Any unused space in either of those two partitions cannot be repurposed to serve the demands of the other partition.

Consistent with some implementations of the present concepts, a dynamic storage module 108 includes the system partition 102, a variable high-density partition 110, and a transitional partition 112. The transitional partition 112 can be set to include a variable low-density partition 114 that constitutes all, some, or none of the transitional partition 112. The variable high-density partition 110 is configured as a TLC memory, and the variable low-density partition 114 is configured as an SLC memory. The transitional partition 112 includes four settings, for example. In the first setting, the transitional partition 112 is configured such that the variable low-density partition 114 is 24 GB at a maximum capacity of 100%. In the first setting, the variable high-density partition 110 has 840 GB, and the variable low-density partition 114 has 24 GB.

In the second setting, at a 50% capacity, the variable low-density partition 114 in the transitional partition 112 has only 12 GB. The other 12 GB of the transitional partition 112 has been converted to 36 GB of high-density memory at a 3:1 ratio from SLC to TLC and has been added to the variable high-density partition 110, which is now 876 GB (840 GB plus 36 GB).

In the third setting, at a 25% capacity, the variable low-density partition 114 in the transitional partition 112 has only 6 GB. The other 6 GB of the transitional partition 112 has been converted to 18 GB of high-density memory at a 3:1 ratio from SLC to TLC and has been added to the variable high-density partition 110, which is now 894 GB (876 GB plus 18 GB).

In the fourth setting, at a 0% capacity, the transitional partition 112 does not include the variable low-density partition 114. The 6 GB of the transitional partition 112 has been converted to 18 GB of high-density memory at a 3:1 ratio from SLC to TLC and has been added to the variable high-density partition 110, which is now 912 GB (894 GB plus 18 GB).

In this example, because there is a difference in density level between the variable high-density partition 110 operating in the TLC mode and the variable low-density partition 114 operating in the SLC mode, each gigabyte of the variable low-density partition 114 that is traded off adds three gigabytes to the variable high-density partition 110. Other conversion ratios are possible depending on the density levels of the source partition and the destination partition.

In one implementation, the division between the variable high-density partition 110 and the variable low-density partition 114 is made at the superblock level in SSD media. However, alternative implementations are possible where the division is made at the die level, the block level, page level, etc. If the division cannot be made precisely at the setting's capacity value (e.g., 50%, 25%, etc.), then the division can be rounded up or down to the nearest division resolution level (e.g., the nearest superblock).

Accordingly, consistent with the present concepts, all or a part of the memory space in the transitional partition 112 can be dynamically switched between high-density memory and low-density memory. The transitional partition 112 can be initialized to any of the capacity settings (e.g., 100% capacity) when shipped from the factory. But, after purchase, the user can switch the transitional partition 112 to any one of the multiple capacity settings depending on her own preferences. Although the transitional partition 112 could theoretically be changed among the settings unlimited number of times, in practice, the frequency and/or the total number of switches can be limited due to NAND reliability and the stress added by each switching.

In some implementations, the variable low-density partition 114 of the transitional partition 112 is logically situated at the tail end of the variable high-density partition 110, such that the variable high-density partition 110 and the variable low-density partition 114 are logically contiguous in all of the settings. Such a configuration eliminates any impact on the current logical locations of the data stored in the variable high-density partition 110. That is, when additional space is added to the variable high-density partition 110, the logical block addresses (LBAs) of the data blocks stored in the variable high-density partition 110 can remain the same. The total range of logical block addresses in the variable high-density partition 110 is expanded to account for the additional space.

The dynamic storage module 108 illustrated in FIG. 1 is just one example. Many variations are possible. For example, the four settings for the transitional partition 112 correlate to four capacities at 100%, 50%, 25%, and 0%, but other capacity values are possible (e.g., 30%, 75%, 90%, etc.). Also, although only four settings were described, the dynamic storage module 108 can include a greater or fewer number of settings at different capacity levels. Furthermore, the sizes and the number of partitions in the dynamic storage module 108, as illustrated in FIG. 1, are just examples. The sizes of the transitional partition 112, the variable high-density partition 110, and the variable low-density partition 114 can vary from the examples in FIG. 1. Moreover, the dynamic storage module 108 can include a greater number of partitions having varying densities. For example, the dynamic storage module 108 can include SLCs, DLCs, TLCs, QLCs, PLCs, etc., or any combination thereof, to suit cost constraints and the demands of efficiently storing different types of data having varying sizes and varying access requirements. Accordingly, the conversion ratios among the multiple partitions can vary (e.g., 4:1 from SLC to QLC, 3:2 from DLC to TLC, etc.). The benefits of having more settings for more granular capacity levels, a larger transitional partition, a greater number of transitional partitions, and a greater number of partitions of different densities should be weighed against the greater complexities added by more convoluted design configurations, difficulties in management, more complicated validation tests, more complex manufacturing requirements, and faster physical deterioration of the device (i.e., wear and tear).

In the example context of gaming, the dynamic storage module 108 is an SSD module inside a game console. The variable high-density partition 110 is a user partition for storing games. The variable low-density partition 114 is a quick-resume partition for storing quick-resume data. In one example implementation, the game console is manufactured and sold with the quick-resume partition set at 100% capacity for the best out-of-the-box (OOB) experience so that the maximum number of slots are available for saving quick-resume states of as many games as possible within the 24 GB capacity while the 840 GB capacity of the user partition is mostly empty. However, later, when the gamer downloads and saves more games in the user partition, and the user partition is too full to download another new game, the gamer can choose to reallocate storage space from the quick-resume partition to the user partition at a conversion ratio that is greater than 1:1. Additionally, if the gamer prefers to save the quick-resume states of more games in the quick-resume partition at the sacrifice of deleting some games saved in the user partition, then the gamer can choose to reallocate space from the user partition to the quick-resume partition. The present concepts provide freedom and choice to the gamer to decide how much space to allocate to the user partition and the quick-resume partition to fit her individual preferences.

Processes

Figure 2:
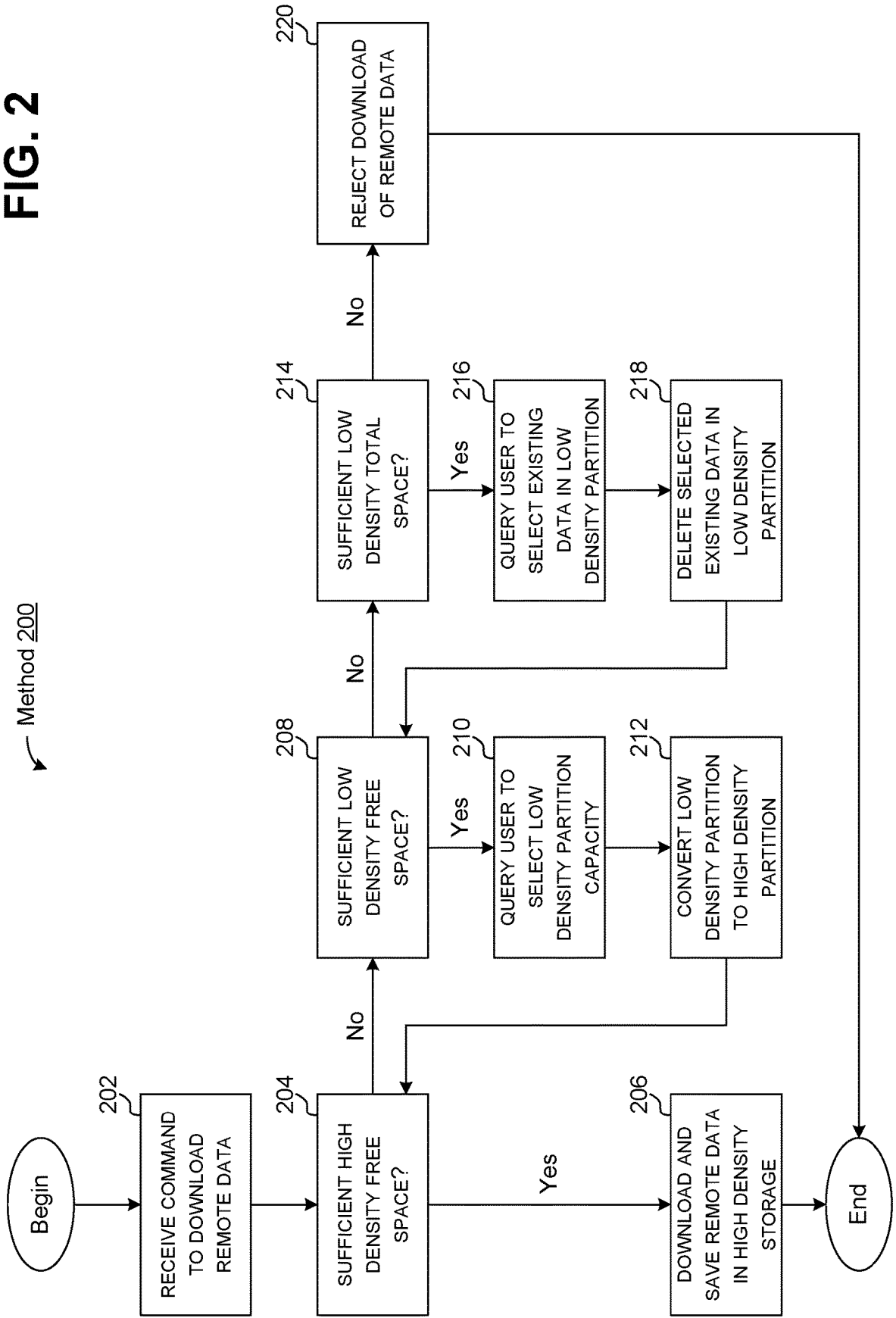
FIG. 2 illustrates an example partition conversion method, consistent with some implementations of the present concepts.

FIG. 2 illustrates an example partition conversion method 200, consistent with some implementations of the present concepts. The partition conversion method 200 is presented for illustration purposes and is not meant to be exhaustive or limiting. The acts in the partition conversion method 200 can be performed in the order presented, in a different order, or in parallel or simultaneously, can be omitted, can include intermediary acts therebetween, and can be repeated in loops.

In act 202, a command to download remote data is received. The remote data can be available for download from a remote server. For example, a user can navigate a graphical user interface (GUI) of a game console to browse a selection of games on a game server and choose a game for download to a high-density partition (e.g., a user partition configured as TLC) in an SSD inside the game console. Alternatively, the user can navigate a GUI to initiate a command to copy a game from an external universal serial bus (USB) drive or from an optical disc (e.g., from a DVD drive or a CD-ROM drive) to the user partition.

In act 204, a check is performed to determine whether there is sufficient free space available in the high-density partition to save the remote data. For example, the game console queries the size of the game chosen by the user for download, queries the size of available free space in the user partition, and compares the two sizes.

If the check in act 204 determines that there is sufficient free space available in the high-density partition to save the remote data, then, in act 206, the remote data is downloaded and saved in the high-density partition. For example, the game console downloads the game selected by the user via the GUI and saves the game in the user partition. Therefore, if the user chooses to download a game that fits in the free space currently available in the user partition, then the game can be downloaded without any switching of a transitional partition in the SSD.

If the check in act 204 determines that there is insufficient free space in the high-density partition to save the remote data, then, in act 208, a check is performed to determine whether there is sufficient free space available in the low-density partition that can be converted to high-density partition to save the remote data. For example, the game console queries the size of free space in the low-density partition (e.g., a quick-resume partition configured as SLC) in the SSD, multiplies the size by the conversion ratio (e.g., 3:1 for converting from SLC to TLC), adds the product to the size of free space in the user partition, and compares the sum to the size of the game.

For instance, suppose the user wants to download a game that is 50 GB but the user partition has only 25 GB of free space available. If the quick-resume partition has 10 GB of free space available that could be converted at a ratio of 3:1 into 30 GB of additional free space in the user partition, then there could be made 55 GB (25 GB plus 30 GB) of free space available in the user partition, which would be enough to save the 50 GB game.

If the check in act 208 determines that there is sufficient free space available in the low-density partition, then, in act 210, the user is queried to select a new capacity for the low-density partition, and the user's selection is received as user input. For example, the game console can display a selection of quick-resume partition sizes (or capacities of the transitional partition) for the user to choose from (e.g., 45 GB, 30 GB, 15 GB, and 0 GB). Alternatively, the selection of quick-resume partition sizes can be displayed as capacity percentages (e.g., 100%, 50%, 25%, and 0%) or as slot numbers for savings quick-resume states (e.g., 5, 3, 1, and 0). The game console can also display the amount of free space available in the quick-resume partition, the amount of free space in the quick-resume partition that needs to be converted and added to the user partition in order to download and save the game, the pre-conversion size and the post-conversion size of the quick-resume partition and of the user partition for each of the selection of capacities, the conversion ratio, etc. In any of these implementations, the user can be notified graphically which choices of capacities are sufficient or insufficient to download the game.

In act 212, the low-density partition is converted and added to the high-density partition. All or a portion of the low-density partition is converted depending on the user's selection in act 210. That is, the capacity of the transitional partition is changed to a different setting.

For example, a central processing unit (CPU) of the game console sends a command to an SSD controller (also called an NVMe controller) of the SSD to set the new capacity of the transitional partition to a lower setting, such that a part or all of the quick-resume partition is converted and added to the user partition. In one implementation, the SSD controller supports the NVMe Command Set. The CPU of the game console sends a specific Set Feature command to the SSD controller to set the size of the transitional partition. The command can include a parameter that specifies the setting for the transitional partition capacity. For example, if the transitional partition can be set to one of four capacity settings, the Set Feature command can be sent with a parameter ranging from 0 to 3. This parameter specifies the quick-resume partition size to be set.

In response to receiving the command, the SSD controller changes the size of the transitional partition based on the parameter value by converting at least a part of the quick-resume partition from the SLC mode to the TLC mode. Therefore, in one implementation, the SSD controller reallocates the division of NAND flash memory from SLC to TLC. For example, in one implementation, the SSD controller can communicate with a NAND microcontroller to change the mode of certain NAND superblocks from SLC to TLC. The SSD control also initiates a Power On Reset (POR) or a subsystem-level reset to propagate the changes to the NAND microcontroller. That way, the converted NAND blocks will persistently operate in the TLC mode.

In one implementation, the SSD controller completes the reallocation of the transitional partition and returns a new logical address block (LBA) range to the CPU of the game console. For example, in one instance, the maximum LBA for the user partition was increased from 0x0D87FFFF to 0x0E27FFFF. Accordingly, the LBA table for the user partition is enlarged to the new LBA maximum value. Correspondingly, the LBA table for the quick-resume partition is shrunk to account for the decrease in the size of the quick-resume partition.

The CPU of the game console can send a Get Feature command to the SSD controller to check or verify the new capacity setting of the transitional partition. If the Set Feature command was executed successfully, then the Get Feature command should return the same parameter (e.g., 0 to 3) that indicates the current capacity setting of the transitional partition. In one implementation, the CPU of the game console can also verify that the SSD controller changed the transitional partition, as the Get Feature command specified, by checking the maximum LBA value for the quick-resume partition and/or the user partition.

After act 212, the partition conversion method 200 returns to act 204 to confirm that there is sufficient free space available in the high-density partition to save the remote data, and continues to act 206 to download the save the remote data in the high-density partition. For example, the game console confirms that the enlarged user partition has sufficient free space available to save the game, then downloads and saves the game to the user partition.

Accordingly, if the user downloads a game that requires more free space than is currently available in the user partition, then the user can be prompted to decrease the size of the quick-resume partition and increase the size of the user partition. For some users who are willing to sacrifice the quick-resume feature to save more games, this function allows those users to adjust the division of storage space between the user partition and the quick-resume partition to fit their individual preferences.

If the check in act 208 determines that there is insufficient free space available in the low-density partition, then, in act 214, a check is performed to determine whether the total space (used space and unused space) in the low-density partition is sufficient to be converted to high-density partition to save the remote data. For example, the game console queries the total size of the quick-resume partition in the SSD, multiplies the total size by the conversion ratio (e.g., 3:1 for converting from SLC to TLC), adds the product to the size of available free space in the user partition, and compares the sum to the size of the game.

For instance, suppose the user wants to download a game that is 50 GB but the user partition has only 20 GB of free space available. The quick-resume partition is currently 30 GB in total size but only 5 GB is free space. Even if the available free space of 5 GB is converted at a ratio of 3:1 into 15 GB of additional free space in the user partition, then there would be only 35 GB (20 GB plus 15 GB) of free space available in the user partition, which would not be enough to save the 50 GB game. However, if more than 5 GB of the quick-resume partition were converted and added to the user partition (by deleting some or all of the existing quick-resume states saved in the quick-resume partition), then enough free space could be made in the user partition to download and save the game. In this example, at least 10 GB of the quick-resume partition would need to be converted into 30 GB of extra free space in the user partition to create a total of 50 GB (20 GB plus 30 GB) of free space in the user partition to save the game. Therefore, at least 5 GB of existing quick-resume data needs to be deleted from the quick-resume partition to download the game.

If the check in act 214 determines that there is sufficient total space in the low-density partition, then, in act 216, the user is queried to select existing data in the low-density partition for deletion. For example, the game console can present on a GUI to the user a list of all quick-resume states that are saved in the quick-resume partition, and enable the user to select and delete one or more of the listed quick-resume states. The game console can also present the sizes of the quick-resume states.

In one implementation, the user can select or unselect each of the quick-resume states that are displayed on the GUI. When the user selects enough quick-resume states whose total size would free up enough space in the quick-resume partition, such that converting the free space in the quick-resume partition would add enough free space in the user partition to be able to download and save the game, then the user can be notified that the current selection of quick-resume states is sufficient. This notification can prevent the user from unnecessarily deleting quick-resume states that do not need to be deleted in order to download and save the game.

In act 218, the selected existing data in the low-density partition is deleted. For example, the game console deletes one or more quick-resume states that were selected by the user for deletion. This operation can involve the CPU of the game console sending a command to the SSD controller to delete all data in the part of the quick-resume partition that will be converted to the user partition. Although acts 216 and 218 have been described as involving the deletion of existing data, alternative means of creating free space in the low-density partition are possible. For example, the existing data can be compressed, moved to another partition, or moved to another storage device.

After act 218, the partition conversion method 200 returns to act 208 to confirm that there is sufficient free space available in the low-density partition to convert to high-density partition and save the remote data. For example, the game console displays a selection of quick-resume partition sizes for the user to choose from, converts at least a part of the quick-resume partition to the user partition, confirms that the enlarged user partition has sufficient free space available to save the game, and then downloads and saves the game to the user partition.

If the check in act 214 determines that there is insufficient total space in the low-density partition, then, in act 220, the command to download the remote data is rejected. The user is notified that the download is not possible because there are insufficient free space in the high-density partition and insufficient total space in the low-density partition to save the remote data. For example, the game console displays a notification to the user that there is not enough storage space to download and save the game. The game console can provide the user the option to delete one or more of the existing saved games from the user partition to create more free space in order to download the new game.

Consistent with some implementations of the present concepts, in the partition conversion method 200, the command to download the data in act 202 can trigger the switching of the transitional partition from one setting to another by converting at least a part of the low-density partition to the high-density partition in act 212.

As mentioned above, the acts in the partition conversion method can be performed in parallel, even if they are described and illustrated in FIG. 2 as being performed serially. For example, downloading a game can take an extended period of time depending on many factors, such as the size of the game, the bandwidth of the network, the write speed of the SSD, etc. Also, converting at least a part of the quick-resume partition to the user partition can also take some time, i.e., it is not an instantaneous change. The total wait time for the user can be shortened if at least a part of act 206 of downloading the game is performed in parallel with at least a part of act 212 of converting the quick-resume partition to the user partition. For example, the game console can begin downloading and saving the game to the user partition, and while the download is progressing, the game console can reconfigure the transitional partition.

Although the partition conversion method 200 has been described in the context of lowering the transitional partition capacity (i.e., converting at least a part of the low-density partition to the high-density partition), the user can also initiate a switching of the transitional partition setting that raises the transitional partition capacity (i.e., converting a part of the high-density partition to the low-density partition). That is, the user can tradeoff storage space between the user partition and the quick-resume partition in both directions like a seesaw.

User Interfaces

Figure 3:
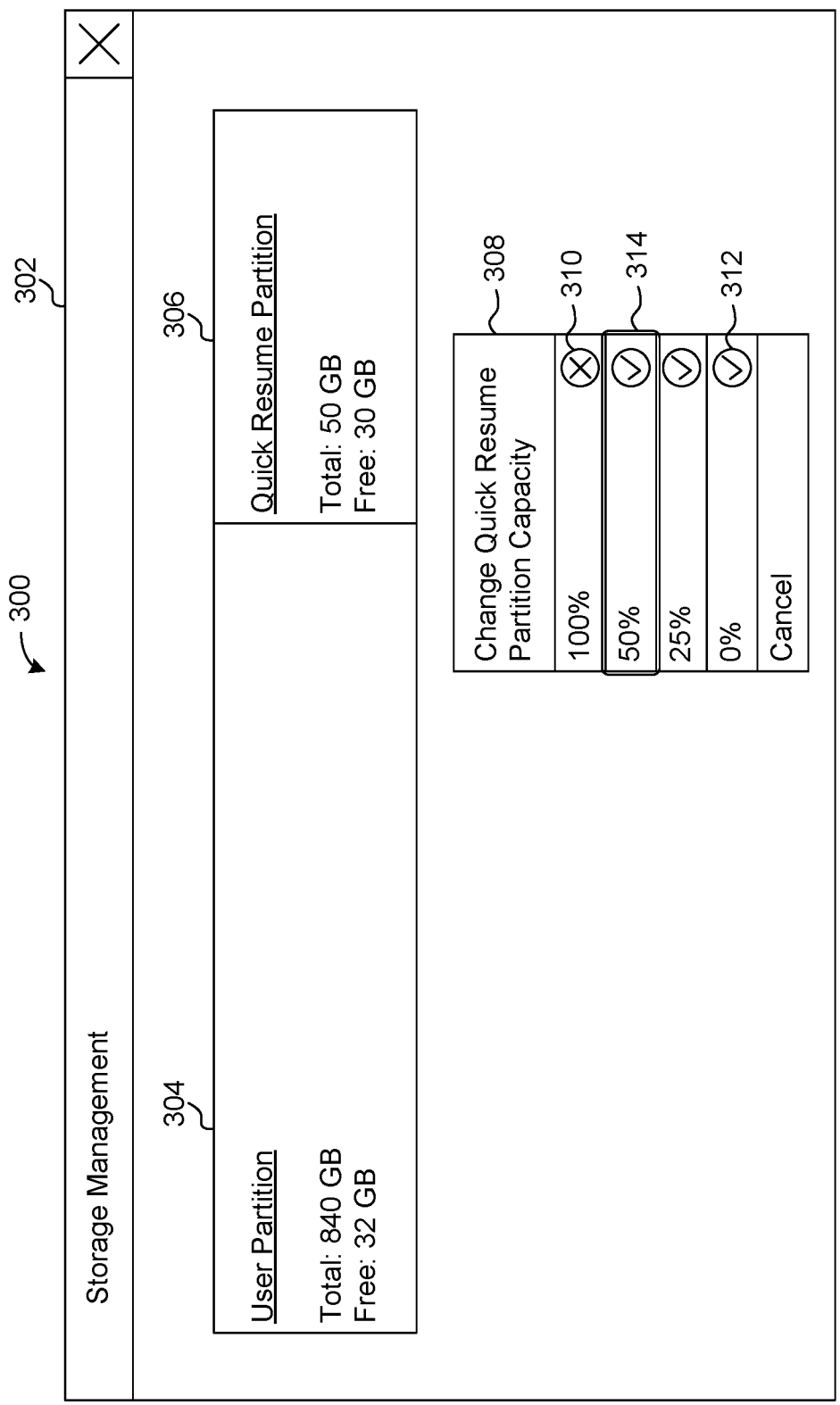
FIG. 3 illustrates an example graphical user interface, consistent with some implementations of the present concepts.

FIG. 3 illustrates an example graphical user interface (GUI) 300, consistent with some implementations of the present concepts. The GUI 300 can present to a user the current allocation of storage space between multiple partitions and enable the user to change the allocation. In one implementation, the GUI 300 is displayed to the user in response to receiving an input from the user to download data and determining that there is not enough storage space to save the data.

The GUI 300 includes a storage management window 302 for interfacing with the user. The storage management window 302 displays the names and sizes of partitions. In this example, the storage management window 302 displays a user partition 304 and a quick-resume partition 306. The storage management window 302 can also display the total size and the free space size of each of the partitions.

Consistent with some implementations of the present concepts, the storage management window 302 displays a menu 308 for changing the quick-resume partition capacity. For example, the quick-resume partition 306 can be set to 100%, 50%, 25%, or 0% capacity. In one implementation, one or more of the capacity settings that will provide sufficient free space in the user partition 304 to download a new game are marked by a positive indicator 312, and one or more of the capacity settings that will provide insufficient free space are marked by a negative indicator 310. In the example illustrated in FIG. 3, the user has selected the 50% capacity setting, as noted by a selector 314. The user can provide an input through the GUI 300 to initiate the change in capacity setting for the quick-resume partition 306 in order to add more free space to the user partition 304.

Figure 4:
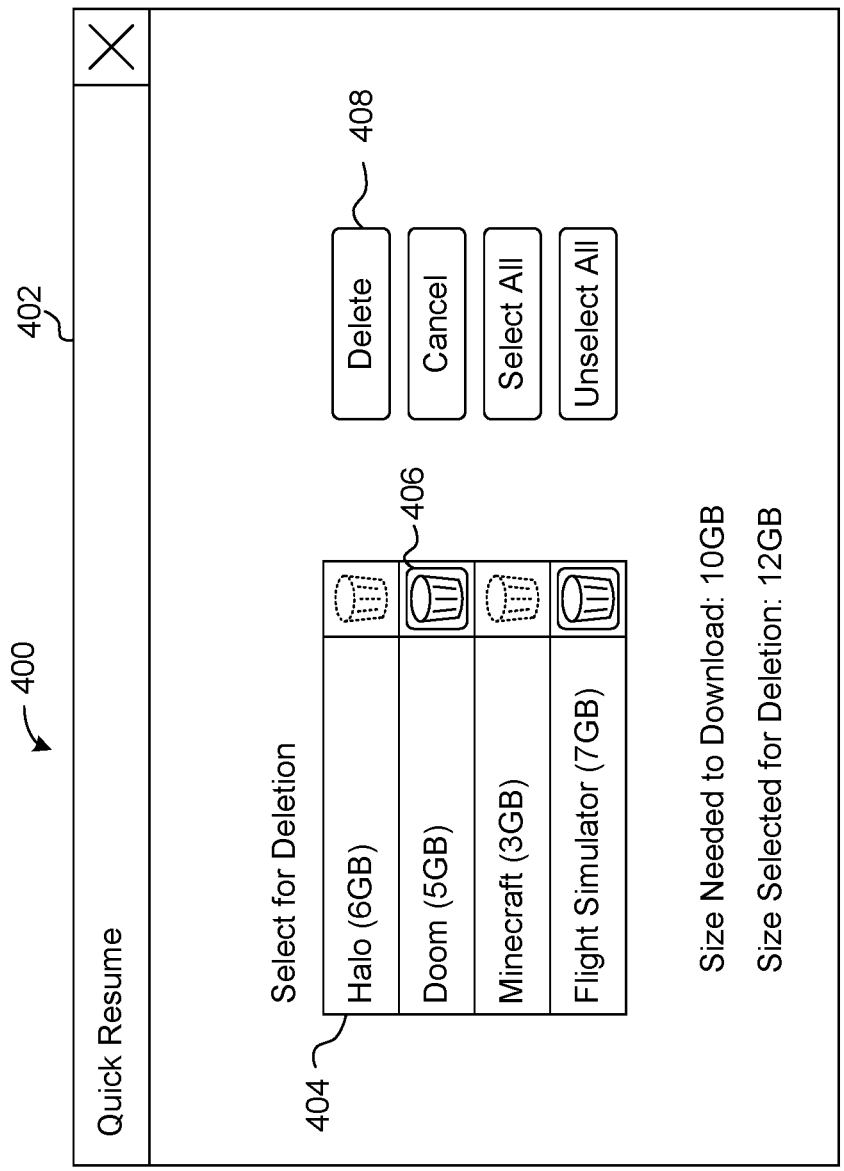
FIG. 4 illustrates an example graphical user interface, consistent with some implementations of the present concepts.

FIG. 4 illustrates an example graphical user interface (GUI) 400, consistent with some implementations of the present concepts. The GUI 400 can present to a user the quick-resume states that are saved in a quick-resume partition for one or games and enable the user to select one or more of the quick-resume states for deletion. In one implementation, the GUI 400 is displayed to the user in response to receiving an input from the user to download data and determining that existing data in a low-density partition needs to be deleted in order to create sufficient free space in a high-density partition to save the data.

The GUI 400 includes a quick-resume deletion window 402 for interfacing with the user. The quick-resume deletion window 402 displays a list 404 of games for which quick-resume states have been saved in a quick-resume partition. In the example illustrated in FIG. 4, four games have quick-resume states saved. In one implementation, the quick-resume deletion window 402 displays the sizes of the quick-resume states in the list 404.

Consistent with some implementations of the present concepts, the user can select and unselect one or more of the games from the list 404 for deletion. In one implementation, the quick-resume states that are selected for deletion are highlighted by a selection indicator 406. In the example illustrated in FIG. 4, two games, Doom and Flight Simulator, have been selected for deletion. The quick-resume deletion window 402 includes buttons 408 for deleting the selected quick-resume states, canceling the deletion, selecting all of the quick-resume states, and unselecting all of the quick-resume states.

In one implementation, the quick-resume deletion window 402 displays the size of existing data (e.g., quick-resume states) that needs to be deleted to create enough free space in a user partition to download a new game and the size of the currently selected existing data (e.g., the quick-resume states). These displayed sizes inform the user whether or not she has selected enough games for deletion to download the new game. The user can provide an input through the GUI 400 (e.g., by selecting the delete button) to initiate the deletion of the selected quick-resume states in order to download and save the new game to the user partition.

Systems

Figure 5:
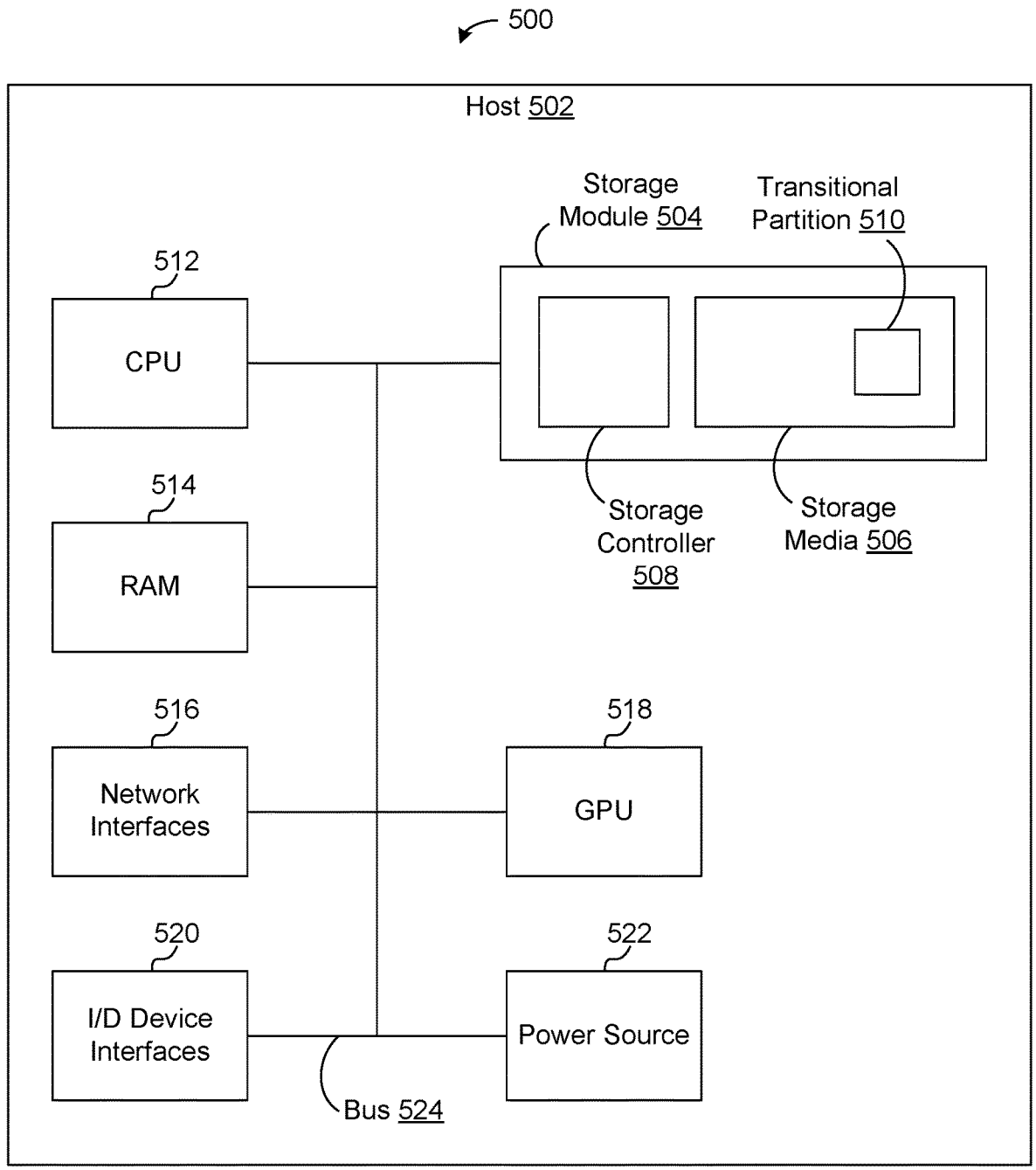
FIG. 5 illustrates an example partition converting system, consistent with some implementations of the present concepts.

FIG. 5 illustrates an example partition converting system 500, consistent with some implementations of the present concepts. The partition converting system 500 includes a host 502. The host 502 can be any electronic device or computer system that stores data. For example, the host 502 can include a server, mainframe computer, workstation, desktop personal computer (PC), laptop, notebook, tablet, smartphone, video game console, appliance, appliance console, kiosk, automobile, automobile navigation or entertainment system, virtual reality simulator, wearable, printer, television, camera, programmable electronics, etc. The host 502 in FIG. 5 is provided as an example to illustrate an implementation of the present concepts. Variations and alternative configurations are possible.

The term "device," "computer," or "computing device" as used herein can mean any type of device that has processing capability and/or storage capability. Processing capability can be provided by circuit logic or a hardware processor that can execute data in the form of computer-readable instructions to provide a functionality.

The host 502 includes one or more components of various types, depending on the nature, type, purpose, and/or function of the host 502. For example, the host 502 includes a storage module 504, such as an SSD module. The storage module 504 includes storage media 506 for storing data, including programs, applications, operating systems, other machine-executable instructions, and/or user data (including game data and quick-resume data). For example, the storage media 506 can include NAND flash memory. The storage module 504 includes a storage controller 508 for controlling and managing the storage media 506. For instance, the storage controller 508 can be an SSD controller. In some implementations, the storage module 504 includes one or more NAND flash controllers (not shown in FIG. 5) for managing the storage media 506 (e.g., NAND flash memory), and the storage controller 508 communicates with the NAND flash controller to control and manage the storage media 506. As used herein, computer readable storage medium can be any available medium for storing information without employing transitory propagated signals or carrier waves.

Consistent with the present concepts, the storage media 506 includes a transitional partition 510. In one implementation, one or more portions of the transitional partition 510 can be configured to operate in varying density modes, such as SLC, DLC, TLC, QLC, PLC, and so on. For instance, one portion of the transitional partition 510 can be set to operate in an SLC mode while another portion of the transitional partition 510 can be set to operate in a TLC mode. In the context of gaming, the portion of the transitional partition 510 that is set to the SLC mode can be used to store quick-resume data, whereas the portion that is set to the TLC mode can be used to store game data. Consistent with the present concepts, a user can provide an input to the host 502 that will cause a CPU 512 to send a command to the storage controller 508, which in turn will change the size and/or the density level mode of a portion of the transitional partition 510.

The host 502 includes the CPU 512 for executing instructions, for example, machine-executable instructions that implement various aspects of the present concepts described herein. Although only one CPU 512 is shown in FIG. 5 for simplicity, the host 502 can include multiple CPUs. The CPU 512 can be a single processor, a multi-processor, single-core units, and/or multi-core units. The CPU 512 can perform processing to implement the present concepts, including all or part of the partition converting method 200. For instance, the CPU 512 can send a command to the storage controller 508 to increase or decrease the low-density capacity of the transitional partition 510.

The host 502 includes random access memory (RAM) 514 for loading active data, programs, applications, operating systems, and/or other machine executable instructions from the storage module 504. The RAM 514 can be volatile and/or non-volatile memory. The RAM 514 is used by the CPU 512 to load, access, and manipulate instructions and/or data for implementing the present concepts.

The host 502 includes one or more network interfaces 516 for interfacing with one or more networks to communicate with other computers or devices (e.g., networked storage, networked display, networked servers, etc.). The network interfaces 516 can include wired network interfaces for connecting to wired networks (e.g., ethernet), and can also include wireless network interfaces for connecting to wireless networks (e.g., Wi-Fi, Bluetooth, cellular, etc.). In some implementations of the present concepts, the host 502 communicates with other devices using the network interfaces 516 to implement all or part of the present concepts, including downloading game data.

The host 502 includes a graphics processing unit (GPU) 518 for executing instructions related to graphics and for displaying graphics on a display screen. The GPU 518 can reside on a graphics card that is connected to an on-board display or an external display, and can include an interface for sending video signals to the display. Consistent with some implementations of the present concepts, the GPU 518 can execute instructions for displaying storage-related information on the display to the user, including the sizes of the portions of the transitional partition 510 that are allocated to operate in different density level modes.

The host 502 includes input/output (I/O) device interfaces 520 for interfacing with one or more I/O devices, such as a keyboard, mouse, game controller, track pad, speaker, microphone, printer, display, scanner, facsimile machine, camera, remote control, joystick, game pad, stylus, touch screen, etc. A user can provide inputs to the host 502 or receive outputs from the host 502 using one or more of these I/O devices via the I/O device interfaces 520.

The host 502 includes a power source 522. The power source 522 can include a battery, an AC-DC converter, or a connection to a DC power source. The power source 522 provides DC power to the various components in the host 502. The power source 522 can be internal to the host 502 (as illustrated in FIG. 5) or external to the host 502.

The host 502 includes a power rail (not pictured in FIG. 5). The power rail can include multiple power lines that connect various components of the host 502 to the power source 522. The power rail is used by the power source 522 to supply power to the various components of the host 502.

The host 502 includes a bus 524. The bus 524 can include multiple signal lines that connect various components of the host 502 and provide interfaces for those components to communicate and transfer signals and/or data among one another.

The host 502 illustrated in FIG. 5 is merely one example. Many other types and configurations of the host 502 are possible. The host 502 may not include all or any of the components described above. The number and the types of components in the host 502 can vary widely.

Generally, any of the functions described herein can be implemented using software, firmware, hardware (e.g., fixed-logic circuitry), or a combination of these implementations. The term "component," "module," or "logic" as used herein generally may represent software, firmware, hardware, circuitry, whole devices or networks, or a combination thereof. In the case of a software implementation of an aspect of the present concepts, these may represent program code that performs specified tasks when executed by a processor. The program code can be stored in one or more computer-readable memory devices, such as computer-readable storage media. The features and techniques of the component, module, or logic may be platform-independent, meaning that they may be implemented on a variety of commercial computing platforms having a variety of processing configurations.

Applications

The present concepts have a wide range of applications. Although the features and applications of these concepts were described above in the context of gaming, using game data and quick-resume data as examples, these concepts can be applied to any type of data. There are many applications that involve different types of data that have varying size requirements and/or access requirements For example, email messages stored in an email server rarely ever change, whereas an inventory database for an ecommerce website changes frequently. Other types of data, such as operating systems, page files for operating systems, system hibernation state data, etc. have varying sizes and varying access demands. The efficiency of storage usage can be enhanced by storing different types of data on different density memory. Therefore, the present concepts can be beneficial in such scenarios by enabling dynamic reallocation of limited storage space among the different density partitions to custom-tailor the storage for individual needs, usage, and/or preferences.

Furthermore, the present concepts were described above using SSDs as an example storage type. However, the present concepts can be applied to any type of storage that can operate in different density modes. For example, hard disk drives (HDDs) include magnetic storage media that have zones, which can be configured to operate in a low-density mode (such as the conventional magnetic record (CMR) mode) or a high-density mode (such as the shingled magnetic recording (SMR) mode). The SMR mode provides about 20% to 30% more storage capacity compared to the CMR mode. Therefore, the size of the partition that is operating in the CMR mode and the size of the partition that is operating in the SMR mode can be dynamically adjusted using the present concepts to meet the storage needs of different types of data.

Moreover, the examples described above included only two partitions of different densities (e.g., one SLC partition and one TLC partition) for simplicity in illustration. However, the concepts described herein can be applied to a storage device with many more partitions of varying density levels (e.g., a ladder of partitions having increasing density levels) to more efficiently serve the needs of multiple types of data with varying size and access requirements.

Various examples are described above. Additional examples are described below. One example includes a system comprising a storage including a transitional partition that includes a variable high-density partition and a variable low-density partition, the transitional partition being configurable to a selection of capacities including a first capacity representing a portion of the transitional partition that is allocated to the variable low-density partition, a remainder of the transitional partition being allocated to the variable high-density partition and a processor configured to execute instructions to present the selection of capacities to a user, receive a first input from the user selecting a second capacity from the selection of capacities, the second capacity being lower than the first capacity, and in response to the first input, reconfigure the transitional partition from the first capacity to the second capacity by converting at least a part of the variable low-density partition to the variable high-density partition.

Another example can include any of the above and/or below examples where the storage includes an SSD.

Another example can include any of the above and/or below examples where the variable low-density partition includes an SLC memory and the variable high-density partition includes an MLC memory.

Another example can include any of the above and/or below examples where the variable low-density partition stores quick-resume data and the variable high-density partition stores game data.

Another example can include any of the above and/or below examples where the processor is further configured to execute the instructions to receive a second input from the user selecting a third capacity from the selection of capacities, the third capacity being higher than the second capacity and in response to the second input, reconfigure the transitional partition from the second capacity to the third capacity by converting at least a part of the variable high-density partition to the variable low-density partition.

Another example can include any of the above and/or below examples where the selection of capacities ranges from all to none of the transitional partition that is allocated to the variable low-density partition.

Another example can include any of the above and/or below examples where the processor is further configured to execute the instructions to delete existing data in the part of the variable low-density partition before converting the part of the variable high-density partition.

Another example includes a computer-implemented method comprising receiving a command to download data to a high-density partition, determining whether the high-density partition has a high-density free space that is large enough to store the data, in response to determining that the high-density free space is not large enough to store the data, converting at least a part of a low-density free space in a low-density partition to the high-density partition and enlarging the high-density free space, downloading the data, and storing the data in the high-density free space of the high-density partition.

Another example can include any of the above and/or below examples where the computer-implemented method further comprises storing game data in the high-density partition and storing quick-resume data in the low-density partition.

Another example can include any of the above and/or below examples where the low-density partition stores one bit per cell.

Another example can include any of the above and/or below examples where the high-density partition stores more than one bit per cell.

Another example can include any of the above and/or below examples where a ratio of a first number of bits added to the high-density free space to a second number of bits in the part of the low-density free space is larger than one-to-one.

Another example can include any of the above and/or below examples where the computer-implemented method further comprises determining whether the low-density free space is large enough to be converted and added to the high-density free space to store the data.

Another example can include any of the above and/or below examples where the computer-implemented method further comprises presenting, to a user, a selection of sizes of the part of the low-density free space to convert to the high-density free space and receiving, from the user, an input selecting a size of the part of the low-density free space to convert to the high-density free space.

Another example can include any of the above and/or below examples where the computer-implemented method further comprises presenting, to a user, existing data stored in the low-density partition for selection, receiving, from the user, an input selecting a set of the existing data stored in the low-density partition, and in response to the input, deleting the set of the existing data from the low-density partition.

Another example can include any of the above and/or below examples where the computer-implemented method further comprises notifying the user when a size of the set of the existing data that the user selected for deletion is large enough to save the data in the high-density free space.

Another example includes a computer-readable storage medium storing instructions which, when executed by a processor, cause the processor to receive a first input from a user to download data, compare a data size of the data with a high-density free space size of a high-density partition, in response to determining that the data size is larger than the high-density free space size, convert at least a part of a low-density free space in a low-density partition to the high-density free space in the high-density partition, download the data, and store the data in the high-density free space.

Another example can include any of the above and/or below examples where the instructions further cause the processor to, in response to determining that the data size is larger than the high-density free space size, determine a low-density free space size of the low-density partition, calculate a converted high-density free space size that would be gained by converting the low-density free space, and compare a sum of the high-density free space size and the converted high-density space size with the data size.

Another example can include any of the above and/or below examples where the instructions further cause the processor to in response to determining that the sum is larger than the data size, prompt the user to choose a new size of the low-density partition.

Another example can include any of the above and/or below examples where the instructions further cause the processor to in response to determining that the sum is smaller than the data size, determine whether a total size of the low-density partition is sufficient to be converted and added to the high-density partition to store the data.

The invention claimed is:

1. A computer-implemented method, comprising:
   receiving a command to download data to a high-density partition;
   determining whether the high-density partition has a high-density free space that is large enough to store the data;
   in response to determining that the high-density free space is not large enough to store the data:
     determining whether a low-density partition has a low-density free space that is large enough to be converted and added to the high-density free space to store the data in the high-density partition; and
     in response to determining that the low-density free space is large enough to be converted and added to the high-density free space to store the data in the high-density partition, converting at least a part of the low-density free space in the low-density partition to the high-density partition and enlarging the high-density free space;
   downloading the data; and
   storing the data in the high-density free space of the high-density partition.

2. The computer-implemented method of claim 1, further comprising:
   storing game data in the high-density partition; and
   storing quick-resume data in the low-density partition.

3. The computer-implemented method of claim 1, wherein the low-density partition stores one bit per cell.

4. The computer-implemented method of claim 1, wherein the high-density partition stores more than one bit per cell.

5. The computer-implemented method of claim 1, wherein a ratio of a first number of bits added to the high-density free space to a second number of bits in the part of the low-density free space is larger than one-to-one.

6. The computer-implemented method of claim 1, further comprising:
   presenting, to a user, a selection of sizes of the part of the low-density free space to convert to the high-density free space; and
   receiving, from the user, an input selecting a size of the part of the low-density free space to convert to the high-density free space.

7. The computer-implemented method of claim 1, further comprising:
   presenting, to a user, existing data stored in the low-density partition for selection;
   receiving, from the user, an input selecting a set of the existing data stored in the low-density partition; and
   in response to the input, deleting the set of the existing data from the low-density partition.

8. The computer-implemented method of claim 7, further comprising:
   notifying the user when a size of the set of the existing data that the user selected for deletion is large enough to store the data in the high-density free space.

9. A computer-readable storage medium storing instructions which, when executed by a processor, cause the processor to:
   receive a first input from a user to download data;
   compare a data size of the data with a high-density free space size of a high-density partition;
   in response to determining that the data size is larger than the high-density free space size:
     determine whether a low-density free space size of a low-density partition is large enough to be converted and added to the high-density free space size to store the data; and
     in response to determining that the low-density free space size is large enough to be converted and added to the high-density free space size to store the data in the high-density partition, convert at least a part of a low-density free space in the low-density partition to a high-density free space in the high-density partition;
   download the data; and
   store the data in the high-density free space.

10. The computer-readable storage medium of claim 9, wherein the instructions further cause the processor to:
    in response to determining that the data size is larger than the high-density free space size:
      determine the low-density free space size of the low-density partition;
      calculate a converted high-density free space size that would be gained by converting the low-density free space; and
      compare a sum of the high-density free space size and the converted high-density space size with the data size.

11. The computer-readable storage medium of claim 10, wherein the instructions further cause the processor to:
    in response to determining that the sum is larger than the data size, prompt the user to choose a new size of the low-density partition.

12. The computer-readable storage medium of claim 10, wherein the instructions further cause the processor to:
    in response to determining that the sum is smaller than the data size, determine whether a total size of the low-density partition is sufficient to be converted and added to the high-density partition to store the data.

13. The computer-readable storage medium of claim 10, wherein calculating the converted high-density free space size comprises multiplying the low-density free space size by a conversion ratio.

14. The computer-readable storage medium of claim 9, wherein the high-density partition and the low-density partition are logically contiguous.

15. The computer-readable storage medium of claim 9, wherein a conversion ratio between the high-density partition and the low-density partition is larger than 1:1.

16. The computer-readable storage medium of claim 9, wherein the instructions further cause the processor to:
    present, to a user, a selection of capacity settings representing sizes of the part of the low-density free space for conversion to the high-density free space.

17. The computer-readable storage medium of claim 16, wherein the instructions further cause the processor to:
    receive, from the user, an input selecting a capacity setting representing a size of the part of the low-density free space for conversion to the high-density free space.

18. The computer-readable storage medium of claim 9, wherein the instructions further cause the processor to:
    in response to determining that the low-density free space size is not large enough to be converted and added to the high-density free space size to store the data in the high-density partition, determine whether a low-density total space size is large enough to be converted and added to the high-density free space size to store the data in the high-density partition.

19. The computer-readable storage medium of claim 18, wherein the instructions further cause the processor to:
    in response to determining that the low-density total space size is large enough to be converted and added to the high-density free space size to store the data in the high-density partition, present existing data in the low-density partition for the user to select for deletion.

20. The computer-readable storage medium of claim 19, wherein the instructions further cause the processor to:
    receive, from the user, an input selecting a set of the existing data stored in the low-density partition; and
    notify the user when a size of the set of the existing data that the user selected for deletion is large enough to store the data in the high-density free space.

\* \* \* \* \*